(12) United States Patent
Li et al.

(10) Patent No.: US 10,863,433 B2
(45) Date of Patent: Dec. 8, 2020

(54) POWER SAVING ON UE REPORTS

(71) Applicant: Mediatek Inc., Hsin-Chu (TW)

(72) Inventors: Xiu-Sheng Li, Hsinchu (TW); Wei-De Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/273,298

(22) Filed: Feb. 12, 2019

(65) Prior Publication Data
US 2019/0253964 A1  Aug. 15, 2019

Related U.S. Application Data

(60) Provisional application No. 62/629,734, filed on Feb. 13, 2018, provisional application No. 62/703,015, filed on Jul. 25, 2018.

(51) Int. Cl.
*H04W 52/02* (2009.01)
*H04B 7/06* (2006.01)
(Continued)

(52) U.S. Cl.
CPC ...... *H04W 52/0206* (2013.01); *H04B 7/0486* (2013.01); *H04B 7/0626* (2013.01); *H04B 7/0632* (2013.01); *H04B 7/0639* (2013.01); *H04B 17/00* (2013.01); *H04L 5/0048* (2013.01); *H04L 43/16* (2013.01); *H04W 24/08* (2013.01);
(Continued)

(58) Field of Classification Search
CPC ............. H04W 52/0206; H04W 24/08; H04W 72/1205; H04W 76/27; H04W 24/10; H04B 17/327; H04B 7/0486; H04B 7/0626; H04B 7/0632; H04B 7/0639; H04B 7/0417; H04L 43/16; H04L 5/0048; H04L 5/0057; H04L 5/0058; H04L 1/0026; H04L 1/0693; H04L 1/0029; H04L 1/003
See application file for complete search history.

(56) References Cited

U.S. PATENT DOCUMENTS 9,813,939 B1  11/2017  Marupaduga et al.
2007/0047502 A1*  3/2007  Marinier ............... H04L 5/0057
370/335
(Continued)

FOREIGN PATENT DOCUMENTS

CN  103580794 A  2/2014

OTHER PUBLICATIONS

International Search Report of PCT/CN2019/074942, dated Apr. 28, 2019.
(Continued)

*Primary Examiner* — Wutchung Chu
(74) *Attorney, Agent, or Firm* — Locke Lord LLP; Tim Tingkang Xia, Esq.

(57) ABSTRACT

A method of wireless communication of a UE is provided. The UE determines a first value of one or more parameters indicating a reception condition of a channel from a base station. The UE determines to adjust channel state information (CSI) reporting based on the first value. The UE transmits UE-assisted information to the base station, and the UE-assisted information includes the one or more parameters or an indication of an adjusted reporting schedule of the CSI reporting. Alternatively, the UE refrains from transmitting a CSI report scheduled in accordance with an existing reporting schedule of the CSI reporting.

19 Claims, 16 Drawing Sheets

(51) Int. Cl.
*H04B 7/0456* (2017.01)
*H04W 76/27* (2018.01)
*H04W 72/12* (2009.01)
*H04W 24/08* (2009.01)
*H04L 12/26* (2006.01)
*H04W 80/02* (2009.01)
*H04L 5/00* (2006.01)
*H04B 17/00* (2015.01)
*H04W 24/10* (2009.01)
*H04B 7/0417* (2017.01)

(52) U.S. Cl.
CPC ....... *H04W 24/10* (2013.01); *H04W 72/1205* (2013.01); *H04W 76/27* (2018.02); *H04W 80/02* (2013.01); *H04B 7/0417* (2013.01)

(56) References Cited

U.S. PATENT DOCUMENTS

| | | | |
|---|---|---|---|
| 2008/0080634 A1* | 4/2008 | Kotecha | H04B 7/0417 375/267 |
| 2008/0268785 A1* | 10/2008 | McCoy | H04L 1/0029 455/67.11 |
| 2009/0046641 A1 | 2/2009 | Wang et al. | |
| 2009/0143091 A1* | 6/2009 | Kim | H04W 52/247 455/522 |
| 2009/0181691 A1* | 7/2009 | Kotecha | H04B 7/0417 455/452.1 |
| 2010/0061258 A1* | 3/2010 | Seo | H04L 1/0026 370/252 |
| 2012/0076017 A1* | 3/2012 | Luo | H04L 1/0027 370/252 |
| 2012/0207040 A1* | 8/2012 | Comsa | H04W 72/1215 370/252 |
| 2012/0310573 A1* | 12/2012 | Sesia | H04L 1/206 702/69 |
| 2012/0314588 A1* | 12/2012 | Nammi | H04L 1/0027 370/252 |
| 2013/0121318 A1* | 5/2013 | Zhang | H04W 72/04 370/336 |
| 2013/0315120 A1* | 11/2013 | Yu | H04W 52/0216 370/311 |
| 2015/0124895 A1* | 5/2015 | Park | H04B 7/0626 375/260 |
| 2016/0014628 A1 | 1/2016 | Kim | |
| 2016/0143055 A1* | 5/2016 | Nammi | H04W 74/006 370/329 |
| 2017/0070277 A1 | 3/2017 | Si et al. | |
| 2018/0042012 A1* | 2/2018 | Yerramalli | H04W 72/0446 |
| 2019/0036579 A1* | 1/2019 | Wei | H04L 5/0048 |
| 2019/0208429 A1* | 7/2019 | Hong | H04W 16/32 |
| 2020/0059282 A1* | 2/2020 | Wu | H04L 1/06 |

OTHER PUBLICATIONS

Taiwan Patent Office, "Office Action", dated Apr. 28, 2020, Taiwan.
China Patent Office, "Office Action", dated Sep. 3, 2020, China.

* cited by examiner

POWER SAVING ON UE REPORTS

CROSS-REFERENCE TO RELATED APPLICATION(S)

This application claims the benefits of U.S. Provisional Application Ser. No. 62/629,734, entitled "NR POWER SAVING ENHANCEMENTS" and filed on Feb. 13, 2018, U.S. Provisional Application Ser. No. 62/703,015, entitled "POWER SAVING CSI REPORTING MECHANISM" and filed on Jul. 25, 2018, both of which are expressly incorporated by reference herein in their entirety.

BACKGROUND

Field

The present disclosure relates generally to communication systems, and more particularly, to techniques of reducing transmission of channel state information (CSI) reports at a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines a first value of one or more parameters indicating a reception condition of a channel from a base station. The UE determines to adjust channel state information (CSI) reporting based on the first value. The UE transmits UE-assisted information to the base station, and the UE-assisted information includes the one or more parameters or an indication of an adjusted reporting schedule of the CSI reporting. Alternatively, the UE refrains from transmitting a CSI report scheduled in accordance with an existing reporting schedule of the CSI reporting.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
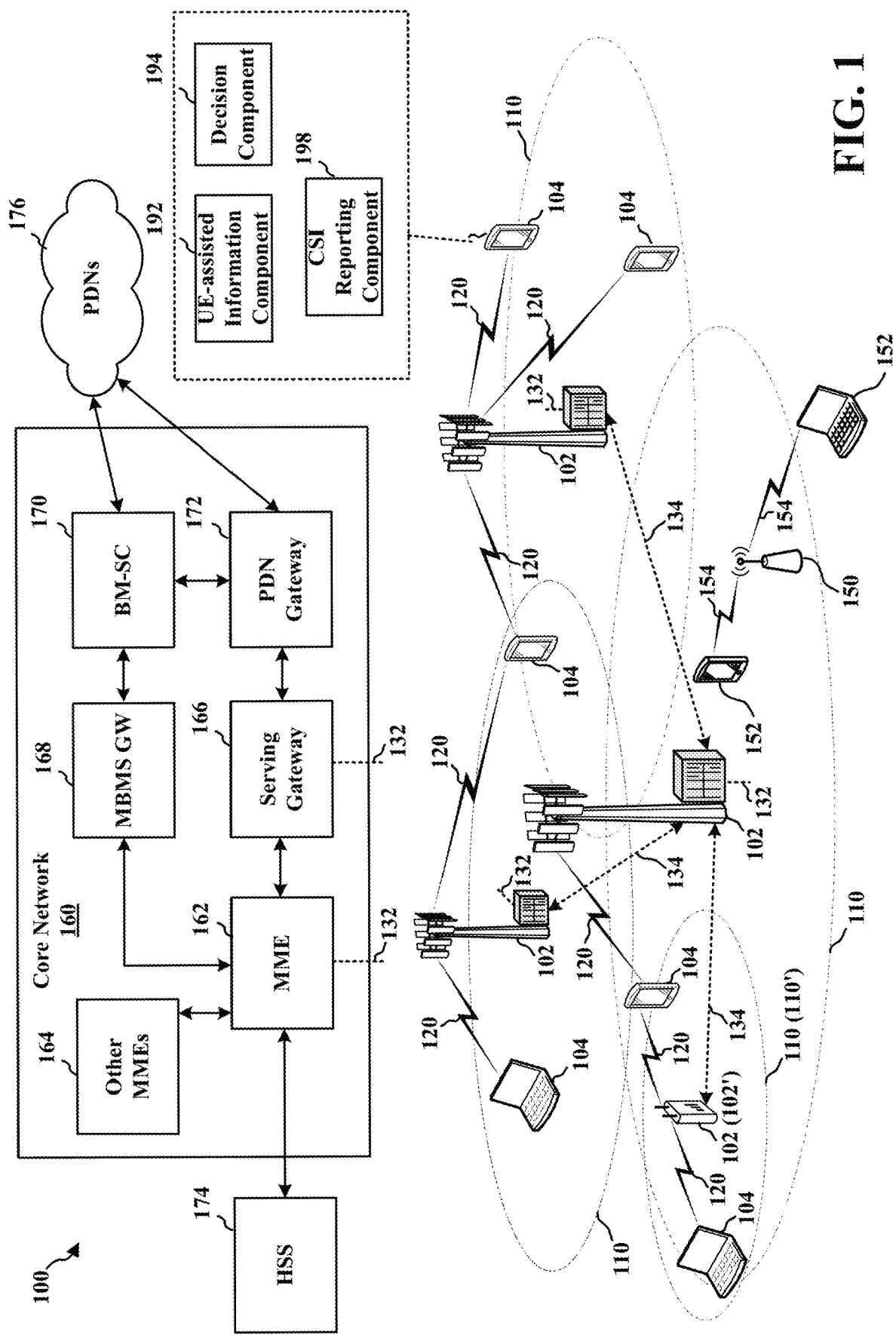
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102′, employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a UE-assisted information component 192, a decision component 194, and a CSI reporting component 198. The decision component 194 determines a first value of one or more parameters indicating a reception condition of a channel from a base station. The CSI reporting component 198 determines to adjust channel state information (CSI) reporting based on the first value. The UE-assisted information component 192 transmits UE-assisted information to the base station, and the UE-assisted information includes the one or more parameters or an indication of an adjusted reporting schedule of the CSI reporting. Alternatively, the CSI reporting component 198 refrains from transmitting a CSI report scheduled in accordance with an existing reporting schedule of the CSI reporting.

Figure 2:
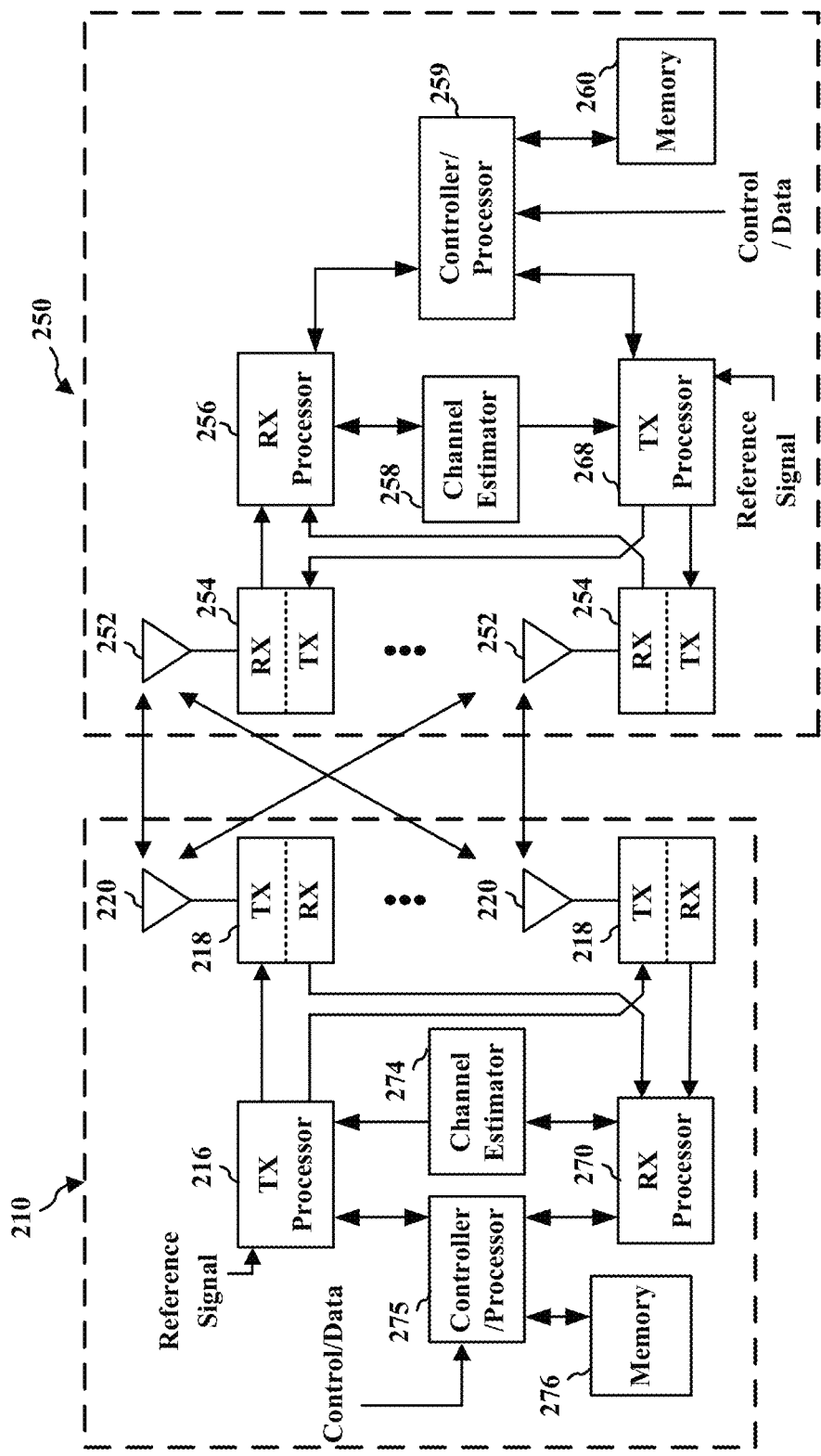
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
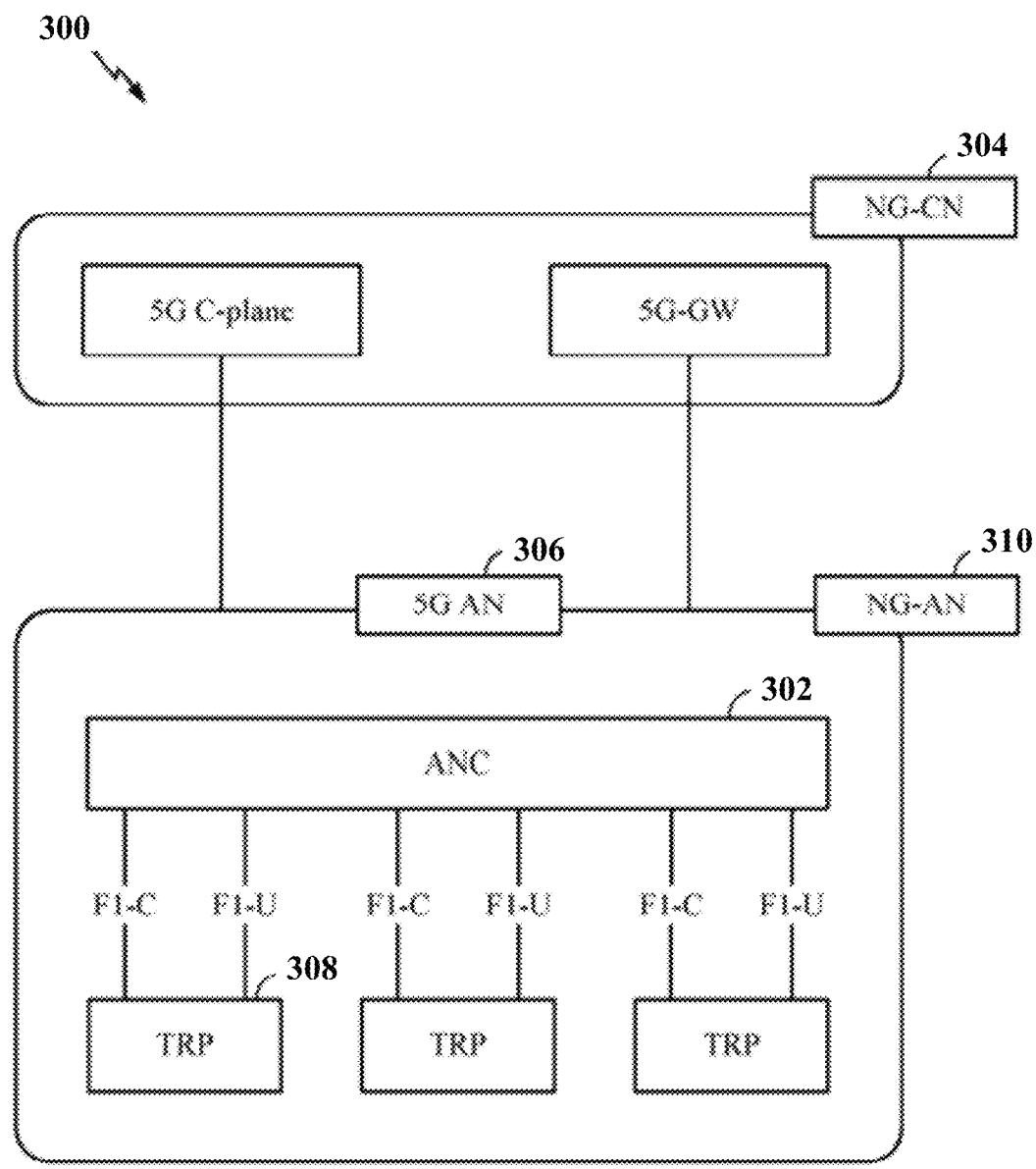
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
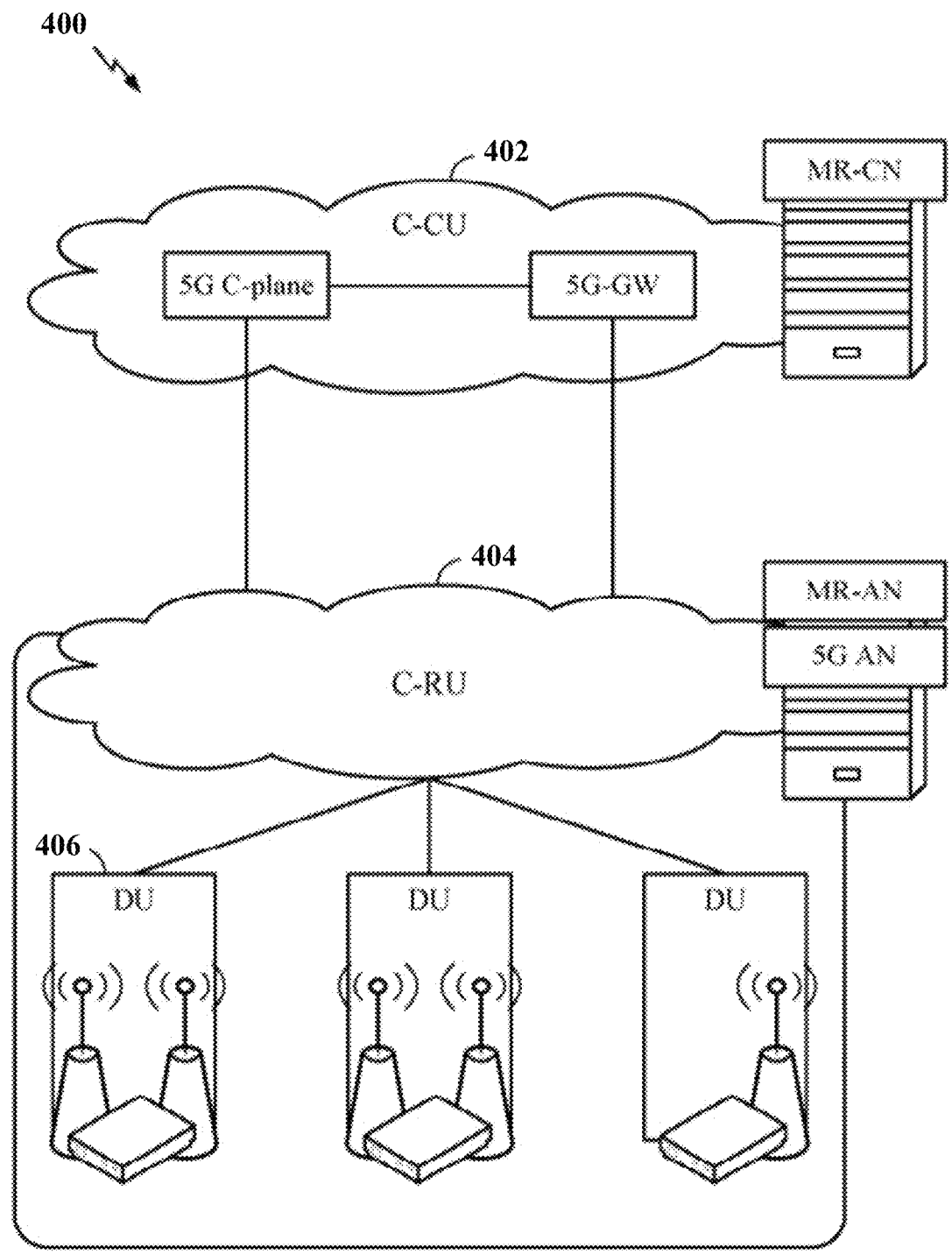
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
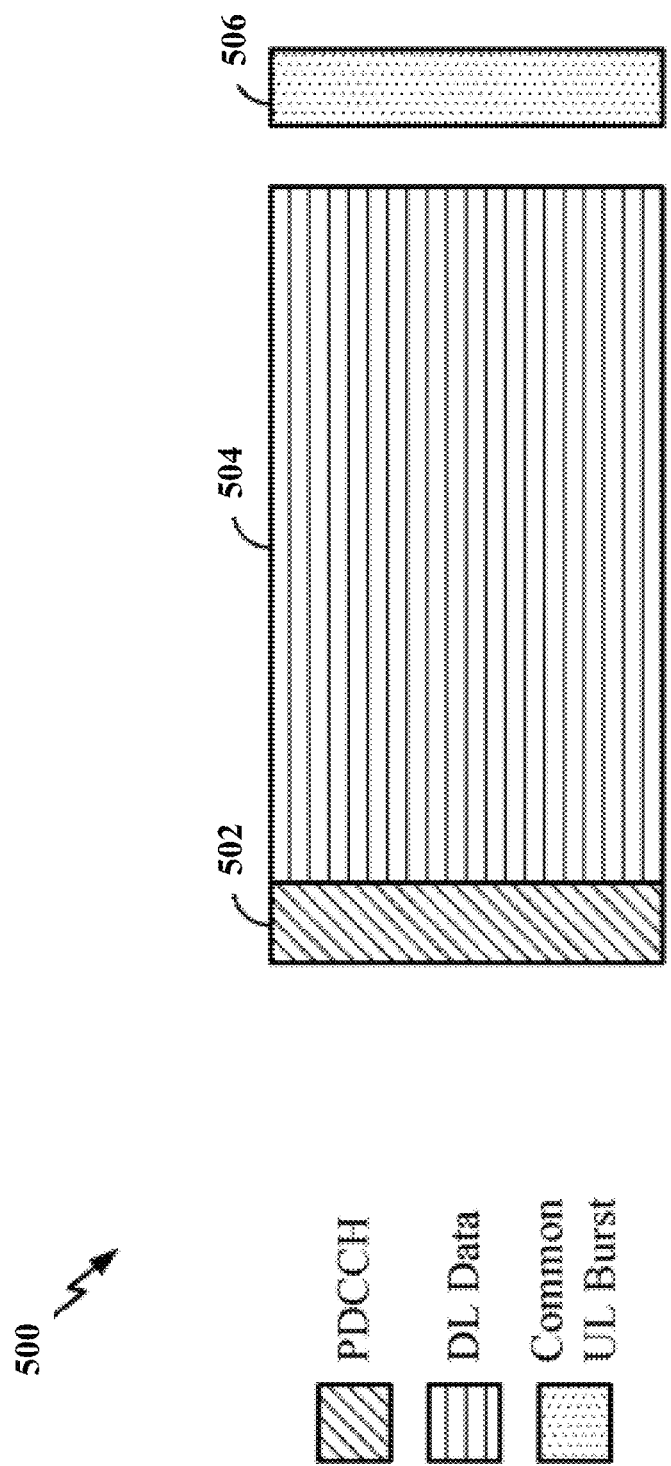
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
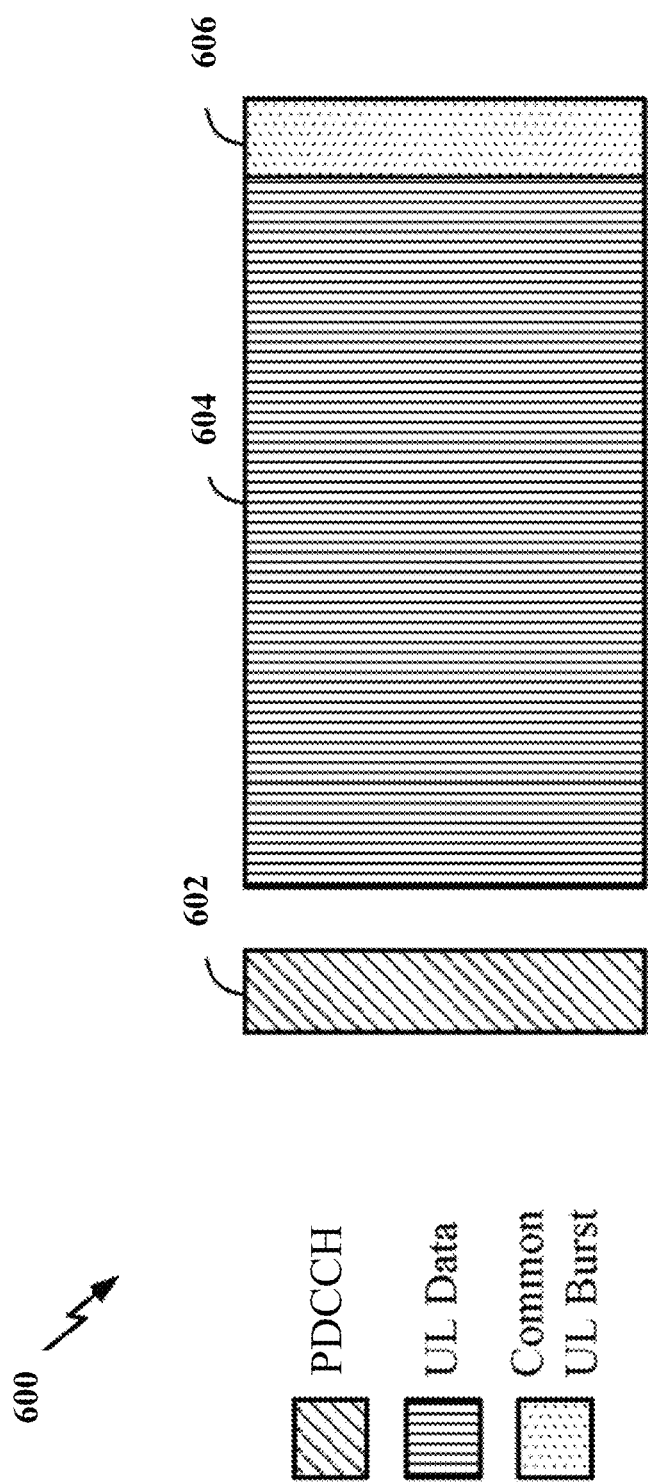
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Mobility parameters indicate a movement of a UE or a movement of an object adjacent to the UE. Mobility related information may include one or more of: a mobility state, a history of mobility state, a number of handovers for a certain period, and cells visited by the UE as well as cells not reselected due to ping-pong effect, etc. As an example, a UE with a speed equal to or smaller than 3 km/h is regarded as a UE in low mobility; a UE with a speed greater than 3 km/h but equal to or smaller than 30 km/h is regarded as a UE in medium mobility; and a UE with a speed greater than 30 km/h is regarded as a UE in high mobility.

Channel state information (CSI) reports provide the network with information about the current channel conditions. In the present disclosure, CSI may include one or more pieces of information: a rank indicator (RI), a precoder matrix indicator (PMI), channel-quality indicator (CQI), a channel state information reference signal (CSI-RS) resource indicator (CRI), and a Layer 1 (L1) reference signal received power (RSRP). CSI reporting may include RI reporting, PMI reporting, CQI reporting, CRI reporting as well as Layer 1 (L1) reference signal received power (RSRP) reporting.

CSI reporting helps a base station for downlink data scheduling and beam selection. Sometimes the power overhead due to CSI reporting is significant (e.g., when downlink data rate is small and uplink transmission takes much power). Therefore, it is desirable to introduce some mechanisms to help a UE with power saving.

Figure 7:
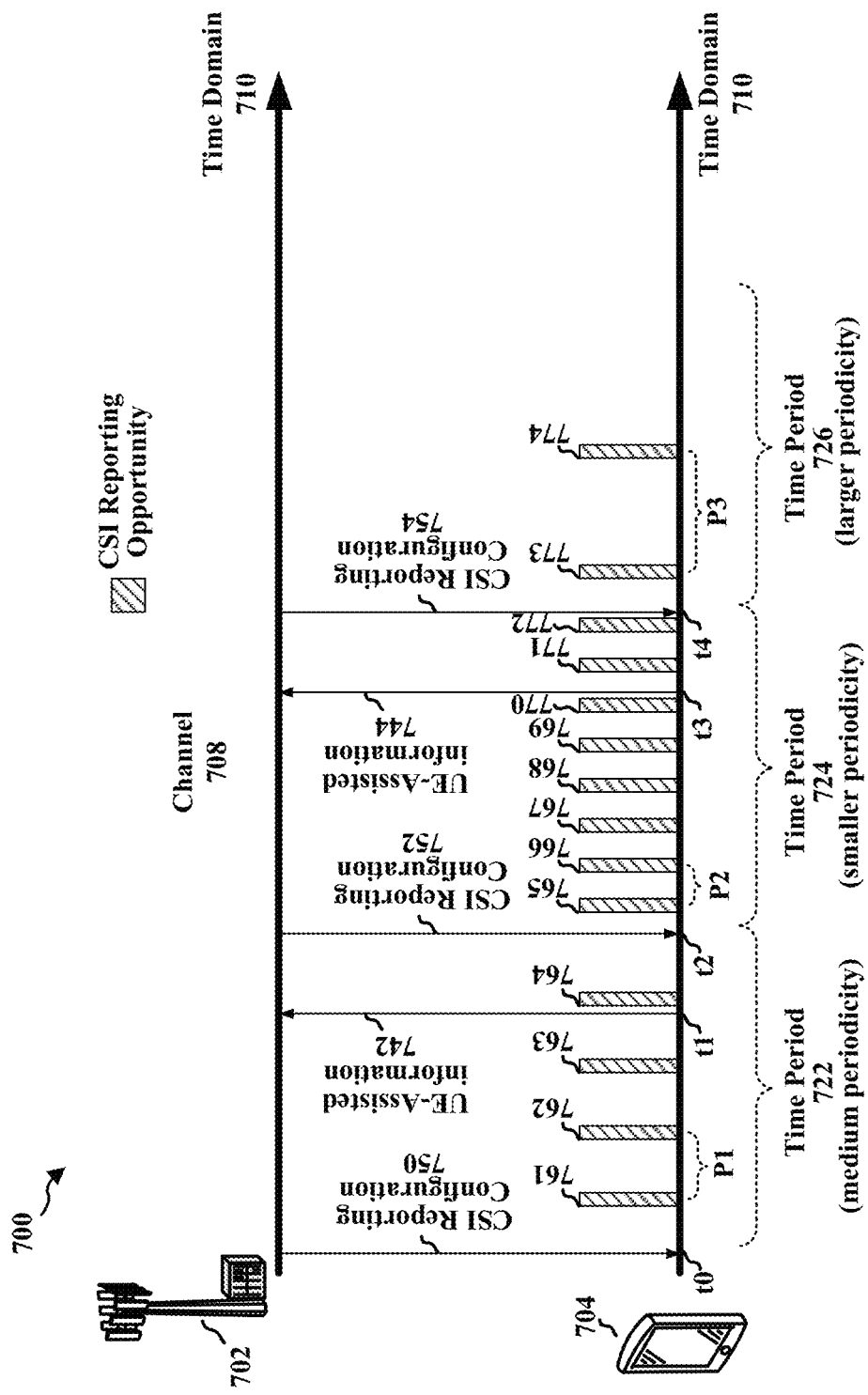
FIG. 7 is a diagram illustrating a first technique of power saving communications between a UE and a base station.

FIG. 7 is a diagram 700 illustrating a first technique of power saving communications between a UE 704 and a base station 702. In this first technique, a UE transmits some UE-assisted information to a base station so that the base station may adjust some configuration for power saving. In this example, the base station 702 communicates with the UE 704 on a channel 708. At a time point t0, the base station 702 may transmit a configuration 750 to the UE 704. The configuration 750 may include information indicating a schedule for the UE 704 to report CSI to the base station 702. Based on the configuration 750, the UE 704 sets up a reporting schedule with multiple CSI reporting opportunities 761-764. At each of the CSI reporting opportunities 761-764, the UE 704 may transmit one or more of CSI reports requested by the base station 702 to the base station 702. Further, in this example, the opportunities 761-764 are periodic; a period between two adjacent opportunities is P1. The periodicity of the CSI reporting opportunities 761-764 may be considered as medium frequent.

The UE 704 may be configured to monitor changes of reception conditions on the channel 708. For example, the UE 704 can determine a change rate in RSRP or signal-to-noise (SNR) ratio on the channel 708. The UE 704 may be configured with different period durations corresponding to different change rates. When the UE 704 determines that the current period duration (e.g., P1) does not match the change rate, the UE 704 may determine an adjusted period duration (e.g., P2) that matches the change rate.

Further, movements of the UE 704 or movements of objects close to the UE can affect the reception conditions of the UE 704 on the channel 708. The UE 704 can determine speed of the UE 704 or speed of objects (e.g., vehicles) surrounding the UE 704. Based on the speed, the UE 704 determine a mobility state of the UE 704. For example, the mobility state may be low mobility, medium mobility, or high mobility described supra.

At the time point t1, the UE 704 may generate and transmit UE-assisted information 742 to the base station 702. The UE-assisted information 742 may include a periodicity parameter indicating the adjusted period duration and/or a mobility parameter indicating the mobility state of the UE 704. The UE 704 may transmit the UE-assisted information 742 through a L1 signaling, a medium access control (MAC) control element (MAC CE), or a radio resource control (RRC) message. The UE 704 may generate and transmit UE-assisted information periodically to the base station 702. Alternatively, the UE-assisted information 742 may be event-triggered. For example, when the UE 704 detects a change in its mobility state, the UE 704 may generate UE-assisted information 742 and transmit the UE-assisted information 742 to the base station 702.

After receiving the UE-assisted information 742, the base station 702 may, based on the UE-assisted information 742, determine an updated CSI reporting schedule. For example, the updated CSI reporting schedule may include periodic CSI reporting opportunities having a period duration of P2. In this example, as the UE 704 has changed to a state of high mobility, P2 is smaller than P1 to provide more frequent CSI reporting opportunities. At the time point t2, the base station 702 transmits an updated CSI reporting configuration 752 to the UE 704. The updated CSI reporting configuration 752 indicates the updated CSI reporting schedule. The UE 704 then adjusts the existing CSI reporting schedule based on the updated CSI reporting configuration 752 received from the base station 702.

In this example, the UE 704 may, at the time point t3, the UE 704 may generate and transmit UE-assisted information 744 to the base station 702. The transmission of the UE-assisted information 744 may be in accordance with a pre-configured schedule (e.g., periodically) or may be triggered by changes of reception conditions on the channel 708. In this example, prior to the time point t3, the UE 704 may detect that the mobility state of the UE 704 has changed from high mobility to low mobility and, in response, transmits the UE-assisted information 744. The UE-assisted information 744 here may include a mobility parameter indicating a low mobility.

After receiving the UE-assisted information 744, the base station 702 may, based on the UE-assisted information 744, determine an updated CSI reporting schedule. For example, the updated CSI reporting schedule may include periodic CSI reporting opportunities having a period duration of P3. In this example, as the UE 704 has changed to a state of low mobility, P3 is greater than P1 and P2 to provide less frequent CSI reporting opportunities. At the time point t4, the base station 702 transmits an updated CSI reporting configuration 754 to the UE 704. The updated CSI reporting configuration 754 indicates the updated CSI reporting schedule. The UE 704 then adjusts the existing CSI reporting schedule based on the updated CSI reporting configuration 754 received from the base station 702.

Figure 8:
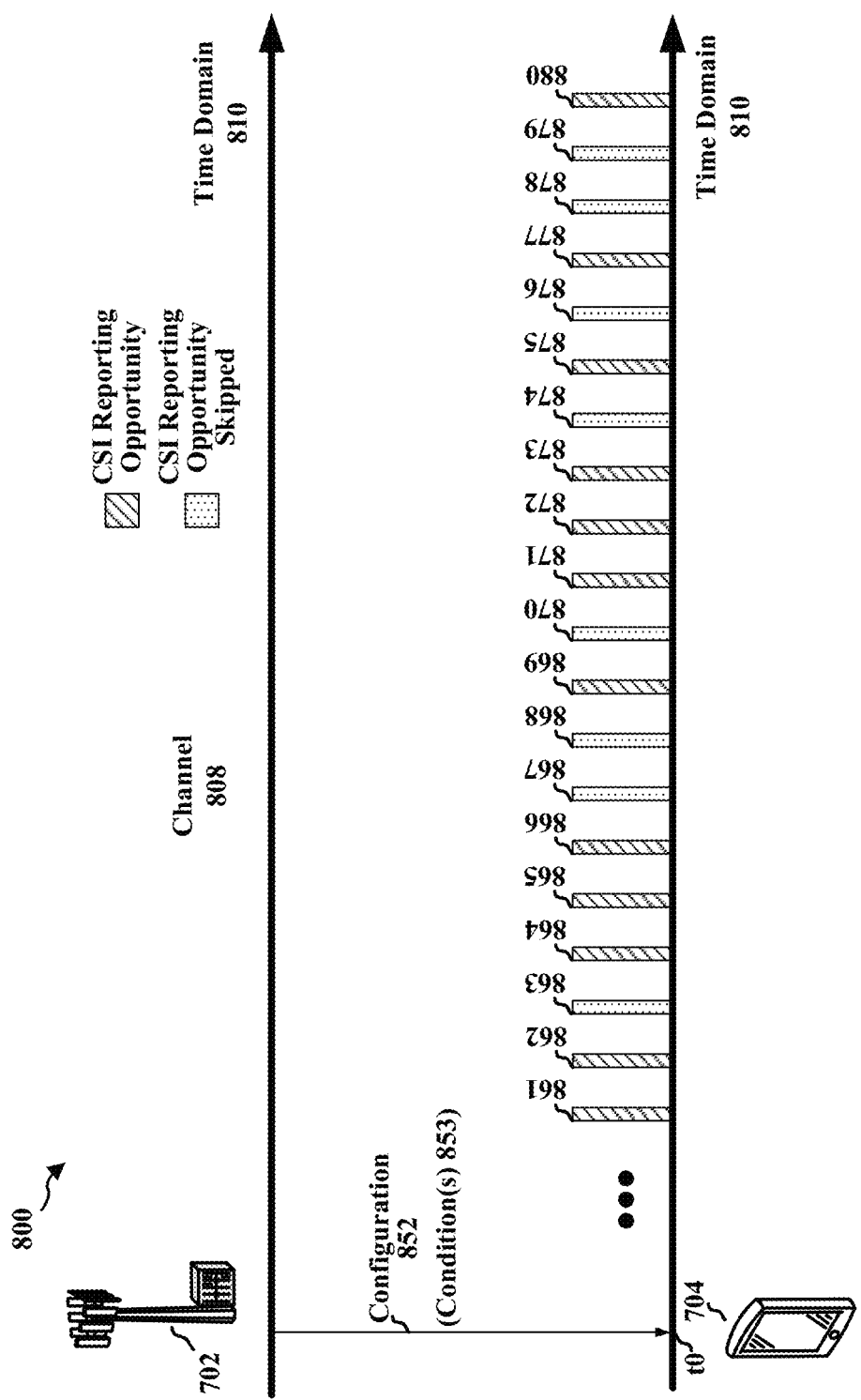
FIG. 8 is a diagram illustrating a second technique of power saving communications between the UE and the base station.

FIG. 8 is a diagram 800 illustrating a second technique of power saving communications between the UE 704 and the base station 702. In this second technique, a UE may skip some CSI reporting opportunities under certain circumstances. In other words, a UE may refrain from transmitting one or more CSI reports scheduled in accordance with an existing CSI reporting schedule including multiple CSI reporting opportunities.

In this example, the base station 702 communicates with the UE 704 on a channel 808. At a time point t0, the base station 702 may transmit a configuration 852 to the UE 704. The configuration 852 may include information indicating a schedule for the UE 704 to report CSI to the base station 702. Based on the configuration 852, the UE 704 sets up a reporting schedule with multiple CSI reporting opportunities 861-880. At each of the CSI reporting opportunities 861-880, the UE 704 may transmit one or more of CSI reports requested by the base station 702 to the base station 702.

Based on the configuration 852, the base station 702 may configure two sets of the CSI reporting opportunities 861-880: a first set of CSI reporting opportunities and a second set of CSI reporting opportunities. Each CSI reporting opportunity in the first set is one that the UE 704 cannot skip. Each CSI reporting opportunity in the second set is one that the UE 704 may skip under certain circumstances. It should be noted that the first set of CSI reporting opportunities may be empty. For example, in the example shown in FIG. 8, the first set is empty. In other words, the UE 704 may skip one or more of the CSI reporting opportunities 861-880 under certain circumstances. Moreover, the configuration 852 may further include one or more conditions 853 for the UE 704 to determine whether to skip a CSI reporting opportunity in the second set or not. Alternatively, some conditions may be predefined without being configured by the base station 702.

The one or more conditions 853 may be associated with one or more of the following parameters: a CRI, a RI, a PMI, a CQI and an RSRP. For example, the UE 704 may measure a current value of a CRI, a RI, a PMI and a CQI at the CSI reporting opportunity 863, respectively. The UE 704 has measured a preceding value of a CRI, a RI, a PMI and a CQI at the preceding CSI reporting opportunity 862, respectively. The UE 704 may compare the difference between the current value and the preceding value of a CRI, a RI, a PMI, a CQI, and an RSRP. The one or more conditions 853 may be: whether the current value and the preceding value of a CRI, a RI and a PMI is the same, respectively; and whether the current value and the preceding value is smaller than a corresponding variation threshold. When the UE 704 determines, at the CSI reporting opportunity 863, that: (1) the current value and the preceding value of a CRI, a RI and a PMI is the same, respectively; and (2) the current value and the preceding value is smaller than the corresponding variation threshold, in one configuration, the UE 704 may skip the CSI reporting opportunity 863. In another configuration, the UE 704 may adjust an existing reporting schedule (e.g., CSI reporting opportunities) of the CSI reporting based on a rule configured for a threshold or a variation threshold of a CRI, a RI, a PMI, a CQI, or an RSRP.

As a result, the UE 704 may, in this example, skip the CSI reporting opportunities 863, 867, 868, 870, 874, 876, 878 and 879 after determination based on the one or more conditions 853.

It should be noted that the one or more conditions 853 may be other one or more conditions. In some configurations, a condition is whether a difference between a current value and a preceding value of a CQI is equal to or smaller than a threshold. Further, the UE 704 may employ separate thresholds for increasing or decreasing CQI. For example, the UE 704 may employ a threshold for increasing CQI which is larger than a threshold for decreasing CQI. Additionally, the UE 704 may jointly consider other conditions. For example, the UE 704 will not skip a CSI reporting opportunity if a current value of one or more of a CRI, a RI or a PMI is not the same as a preceding value thereof, regardless of the difference between a current value and a preceding value of a CQI.

In some configurations, a condition is whether a difference between a current value and a preceding value of a RSRP is equal to or smaller than a threshold.

In some configurations, the UE 704 will not skip a CSI reporting opportunity if a current value of one or more of a CRI, a RI or a PMI is not the same as a preceding value thereof.

In some configurations, if a current value of a CRI, a RI and a PMI is the same as a preceding value thereof respectively, the UE 704 may skip a CSI reporting opportunity, depending on other conditions. On the other hand, if a current value of one or more of a CRI, a RI or a PMI is not the same as a preceding value thereof, the UE 704 may skip a CSI reporting opportunity when a difference between a current value and a preceding value of a CQI is equal to or smaller than a threshold.

Figure 9:
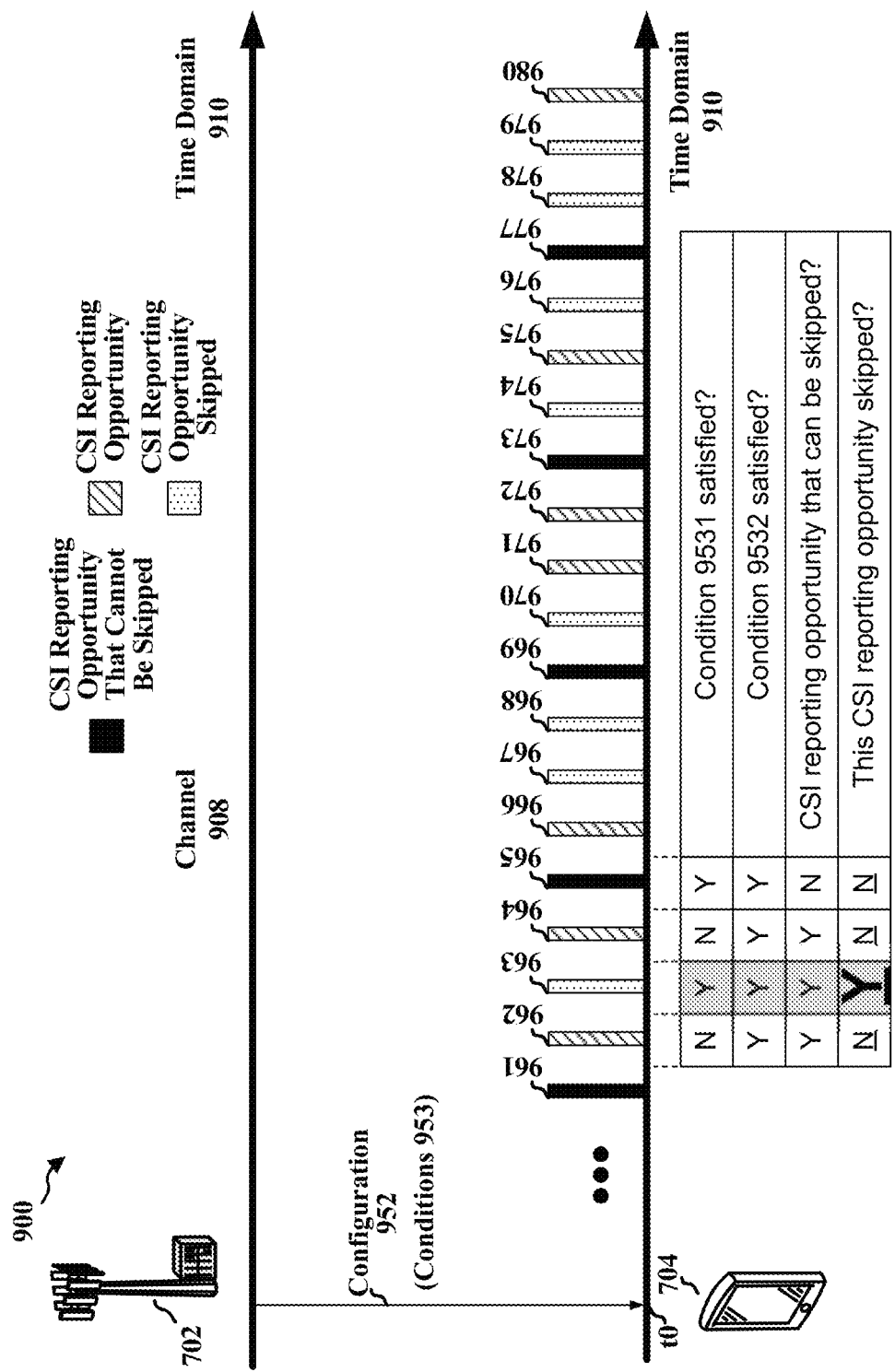
FIG. 9 is another diagram illustrating the second technique of power saving communications between the UE and the base station.

FIG. 9 is a diagram 900 illustrating the second technique of power saving communications between the UE 704 and the base station 702. In this example, the base station 702 communicates with the UE 704 on a channel 908. At a time point t0, the base station 702 may transmit a configuration 952 to the UE 704. The configuration 952 may include information indicating a schedule for the UE 704 to report CSI to the base station 702. Based on the configuration 952, the UE 704 sets up reporting schedule with multiple CSI reporting opportunities 961-980. At each of the CSI reporting opportunities 961-980, the UE 704 may transmit one or more of CSI reports requested by the base station 702 to the base station 702.

Based on the configuration 952, the base station 702 may configure two sets of the CSI reporting opportunities 961-980: a first set of CSI reporting opportunities and a second set of CSI reporting opportunities. Each CSI reporting opportunity in the first set is one that the UE 704 cannot skip. Each CSI reporting opportunity in the second set is one that the UE 704 may skip under certain circumstances. One example of configuring the first set is configuring one CSI reporting opportunity that the UE 704 cannot skip every N CSI reporting opportunities, and N is an integer greater than 1. In this example, the first set includes the CSI reporting opportunities 961, 965, 969, 973 and 977. The second set includes the CSI reporting opportunities 962-964, 966-968, 970-972, 974-976 and 978-980.

Moreover, the configuration 952 may further include multiple conditions 953 for the UE 704 to determine whether to skip a CSI reporting opportunity in the second set or not. In this example, the conditions 953 are associated with four parameters: CRI, RI, PMI and CQI. More specifically, the conditions 953 include a condition 9531 and a condition 9532. The condition 9531 is whether a current value of a CRI, a RI or a PMI is the same as a preceding value thereof, respectively. The condition 9532 is whether a difference between a current value and a preceding value of a CQI is equal to or smaller than 1.

Take the CSI reporting opportunities 962-965 as examples. Based on the configuration 952, the CSI reporting opportunity 965 is one that the UE 704 cannot skip (i.e., one of the first set), the CSI reporting opportunities 962-964 are ones that the UE 704 may skip based on the conditions 9531 and 9532 (i.e., three of the second set).

The UE 704 may determine whether the condition 9531 is satisfied at the CSI reporting opportunities 962-965. As a result, the UE 704 determines that the condition 9531 is satisfied at the CSI reporting opportunities 963 and 965, and the condition 9531 is not satisfied at the CSI reporting opportunities 962 and 964.

The UE 704 may determine whether the condition 9532 is satisfied at the CSI reporting opportunities 962-965. As a result, the UE 704 determines that the condition 9532 is satisfied at the CSI reporting opportunities 962-965.

Therefore, the UE 704 may skip the CSI reporting opportunity 963, because the UE 704 determines that, at the CSI reporting opportunity 963, (1) the CSI reporting opportunity 963 is one that the UE 704 may skip; (2) the condition 9531 is satisfied; and (3) the condition 9532 is satisfied.

Similarly, based on the configuration 952 and the conditions 9531 and 9532, the UE 704 may further skip the CSI reporting opportunities 967-968, 970, 974, 976 and 978-979.

Figure 10:
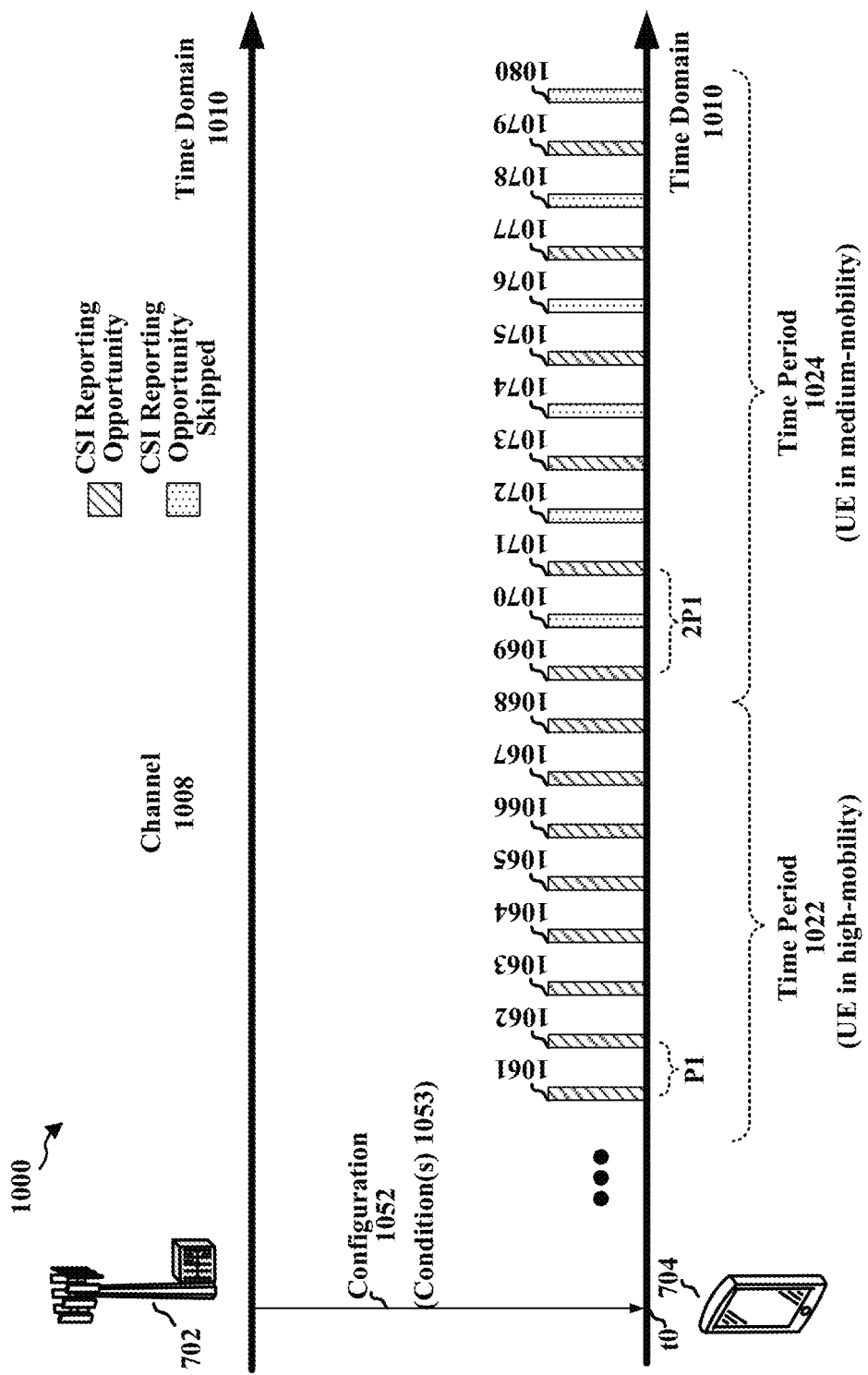
FIG. 10 is yet another diagram illustrating the second technique of power saving communications between the UE and the base station.

FIG. 10 is a diagram 1000 illustrating the second technique of power saving communications between the UE 704 and the base station 702. In this example, the base station 702 communicates with the UE 704 on a channel 1008. At a time point t0, the base station 702 may transmit a configuration 1052 to the UE 704. The configuration 1052 may include information indicating a schedule for the UE 704 to report CSI to the base station 702. Based on the configuration 1052, the UE 704 sets up a reporting schedule with multiple CSI reporting opportunities 1061-1080. At each of the CSI reporting opportunities 1061-1080, the UE 704 may transmit one or more of CSI reports requested by the base station 702 to the base station 702. Further, in this example, the opportunities 1061-1080 are periodic; a period between two adjacent opportunities is P1.

Based on the configuration 1052, the base station 702 may configure two sets of the CSI reporting opportunities 1061-1080: a first set of CSI reporting opportunities and a second set of CSI reporting opportunities. Each CSI reporting opportunity in the first set is one that the UE 704 cannot skip. Each CSI reporting opportunity in the second set is one that the UE 704 may skip under certain circumstances. It should be noted that the first set of CSI reporting opportunities may be empty. For example, in the example shown in FIG. 10, the first set is empty. In other words, the UE 704 may skip one or more of the CSI reporting opportunities 1061-1080 under certain circumstances. Moreover, the configuration 1052 may further include one or more conditions 1053 for the UE 704 to determine whether to skip a CSI reporting opportunity in the second set or not. Alternatively, some conditions may be predefined without being configured by the base station 702.

The one or more conditions 1053 may be associated with mobility parameters described supra. For example, the UE 704 may be configured to monitor a change in mobility parameters of the UE 704. For example, the UE 704 can determine that the UE 704 is in high mobility described supra in the time period 1022. In the time period 1024, the UE 704 can determine that the UE 704 is in medium mobility described supra. The UE 704 may be configured with different period durations corresponding to different mobility parameters. When the UE 704 determines that the current period duration (e.g., P1) in the time period 1024 does not match the medium mobility, the UE 704 may determine an adjusted period duration (e.g., 2P1) that matches the medium mobility.

In other words, in a time period 1022, the UE 704 has a high mobility, and one of the multiple conditions 1053 is not satisfied. Therefore, the UE 704 may not skip any of the CSI reporting opportunities 1061-1068. In a time period 1024, the UE 704 has a medium mobility smaller than a threshold, and one of the multiple conditions 1053 is satisfied. Moreover, when other conditions (e.g., whether a CSI reporting opportunity is an even-numbered one) of the multiple conditions 1053 are satisfied, the UE 704 may skip corresponding CSI reporting opportunities. As a result, the UE 704 may skip the CSI reporting opportunities 1070, 1072, 1074, 1076, 1078 and 1080. From another perspective, the UE 704 adjusts its CSI reporting period duration from P1 to 2P1.

Figure 11:
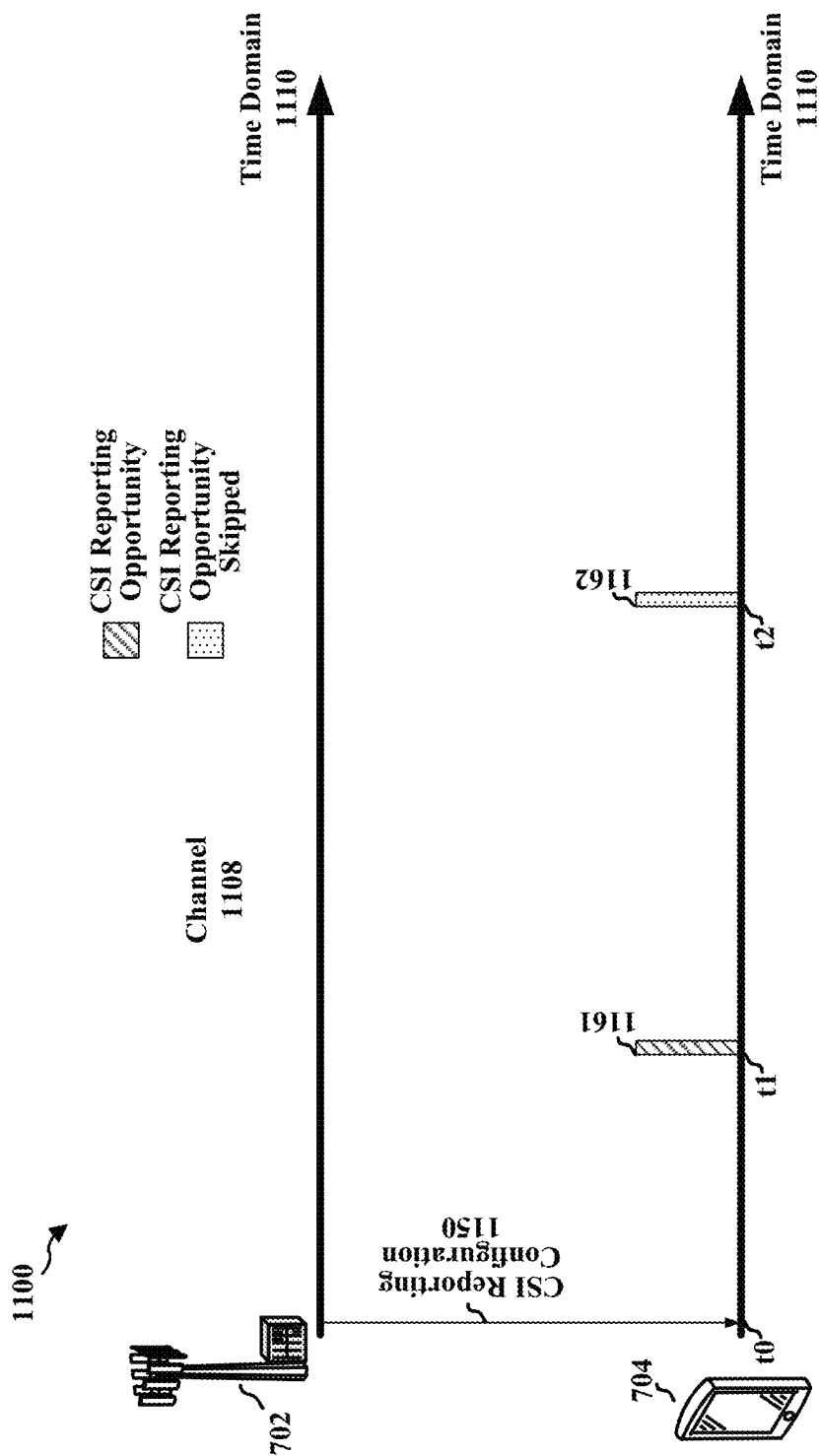
FIG. 11 is a diagram illustrating a third technique of power saving communications between the UE and the base station.

FIG. 11 is a diagram 1100 illustrating a third technique of power saving communications between the UE 704 and the base station 702. In this third technique, a UE may skip a CSI reporting opportunity if a CSI reporting result is the same or similar to a previous CSI reporting result. In other words, a UE may refrain from transmitting a CSI reporting result scheduled in accordance with an existing CSI reporting schedule including multiple CSI reporting opportunities. In this example, the base station 702 communicates with the UE 704 on a channel 1108.

At a time point t0, the base station 702 may transmit a configuration 1150 to the UE 704. The configuration 1150 may include information indicating a schedule for the UE 704 to report CSI to the base station 702. Based on the configuration 1150, the UE 704 sets up a reporting schedule with multiple CSI reporting opportunities 1161-1162. At each of the CSI reporting opportunities 1161-1164, the UE 704 may transmit one or more of CSI reports requested by the base station 702 to the base station 702.

In this example, at the time point t2, the UE 704 may determine a difference of a current value (i.e., at the time point t2) and a preceding value (i.e., at the time point t1) of one or more parameters associated with CSI reporting (e.g., a CRI, a RI, a PMI, a CQI and a RSRP) is equal to or smaller than a threshold. It should be noted that the threshold may be zero. When the UE 704 determines that the difference is smaller than the threshold, the UE 704 may skip the CSI reporting opportunity 1162. In other words, the UE 704 does not transmit corresponding CSI reports to the base station 702 at the time point t2. From the perspective of the base station 702, when the base station 702 cannot decode CSI reports supposed to be transmitted at the time point t2, the base station 702 will use CSI reports at a previous CSI reporting opportunity (i.e., the CSI reporting opportunity 1161).

Figure 12:
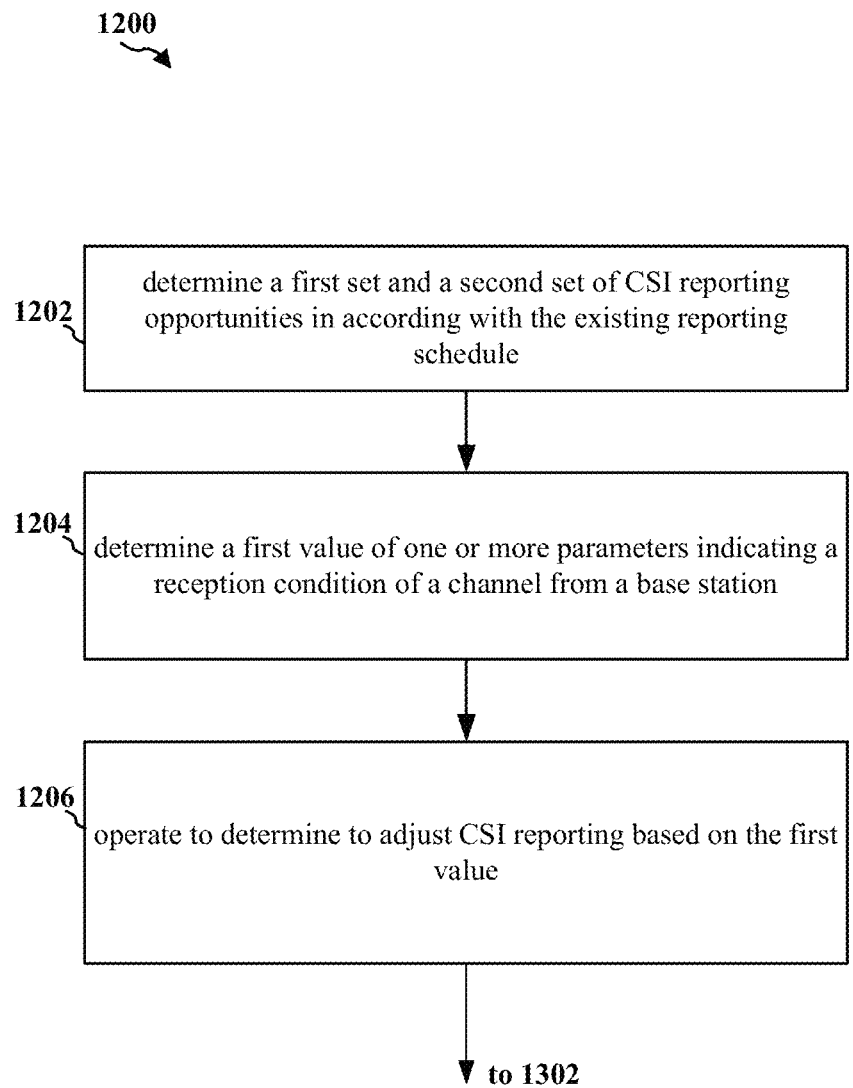
FIG. 12 is a flow chart illustrating a method (process) of power saving communications.

FIG. 12 is a flow chart 1200 illustrating a method (process) of power saving communications. The method may be performed by a UE (e.g., the UE 704, the apparatus 1502/1502'). At operation 1202, the UE 704 determines a first set (e.g., the CSI reporting opportunities 961, 965, 969, 973 and 977) and a second set (e.g., the CSI reporting opportunities 962-964, 966-968, 970-972, 974-976 and 978-980) of CSI reporting opportunities in according with the existing reporting schedule. At operation 1204, the UE 704 determines a first value of one or more parameters indicating a reception condition of a channel from a base station (e.g., the base station 702). In some configurations, the one or more parameters includes one or more of a rank indicator (RI), a precoder matrix indicator (PMI), a channel-quality indicator (CQI), a CSI reference signal resource indicator (CRI), and a reference signal received power (RSRP). At operation 1206, the UE 704 operates to determine to adjust CSI reporting based on the first value. In some configurations, the determining to adjust CSI reporting is at one of the second set of CSI reporting opportunities. Operation 1206 is followed by operation 1302 in FIG. 13.

Figure 13:
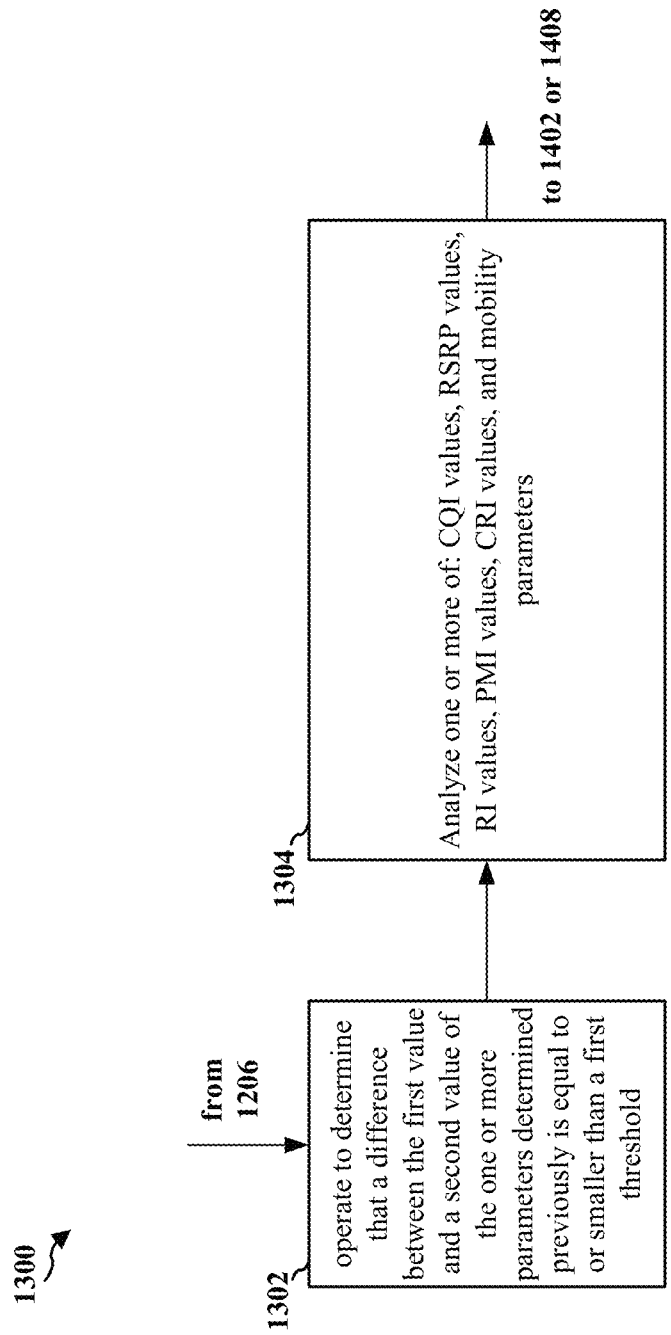
FIG. 13 is a flow chart illustrating a method (process) of power saving communications.

FIG. 13 is a flow chart 1300 illustrating a method (process) of power saving communications. The method may be performed by a UE (e.g., the UE 704, the apparatus 1502/1502'). At operation 1302, the UE 704 operates to determine that a difference between the first value (e.g., determined at the CSI reporting opportunity 1162) and a second value (e.g., determined at the CSI reporting opportunity 1161) of the one or more parameters determined previously is equal to or smaller than a first threshold. In some configurations, the first threshold is zero. At operation 1304, the UE 704 analyzes one or more of: CQI values, RSRP values, RI values, PMI values, CRI values, and mobility parameters. The mobility parameters indicate a movement of the UE or a movement of an object adjacent to the UE. Specifically, the UE 704 may determine that a difference between a current CQI value (e.g., determined at the CSI reporting opportunity 1162) and a preceding CQI value (e.g., determined at the CSI reporting opportunity 1161) is equal to or smaller than a second threshold. The UE 704 may determine that a difference between a current RSRP value (e.g., determined at the CSI reporting opportunity 1162) and a preceding RSRP value (e.g., determined at the CSI reporting opportunity 1161) is equal to or smaller than a third threshold. The UE 704 may determine that a difference between a current RI value (e.g., determined at the CSI reporting opportunity 1162) and a preceding RI value (e.g., determined at the CSI reporting opportunity 1161) is equal to or smaller than a fourth threshold. The UE 704 may determine that a difference between a current PMI value (e.g., determined at the CSI reporting opportunity 1162) and a preceding PMI value (e.g., determined at the CSI reporting opportunity 1161) is equal to or smaller than a fifth threshold. The UE 704 may determine that a difference between a current CRI value (e.g., determined at the CSI reporting opportunity 1162) and a preceding CRI value (e.g., determined at the CSI reporting opportunity 1161) is equal to or smaller than a sixth threshold. The UE 704 may determine that a mobility parameter of the UE satisfies a first mobility condition. Operation 1304 is followed by operation 1402 or 1408 in FIG. 14 depending on different configuration.

Figure 14:
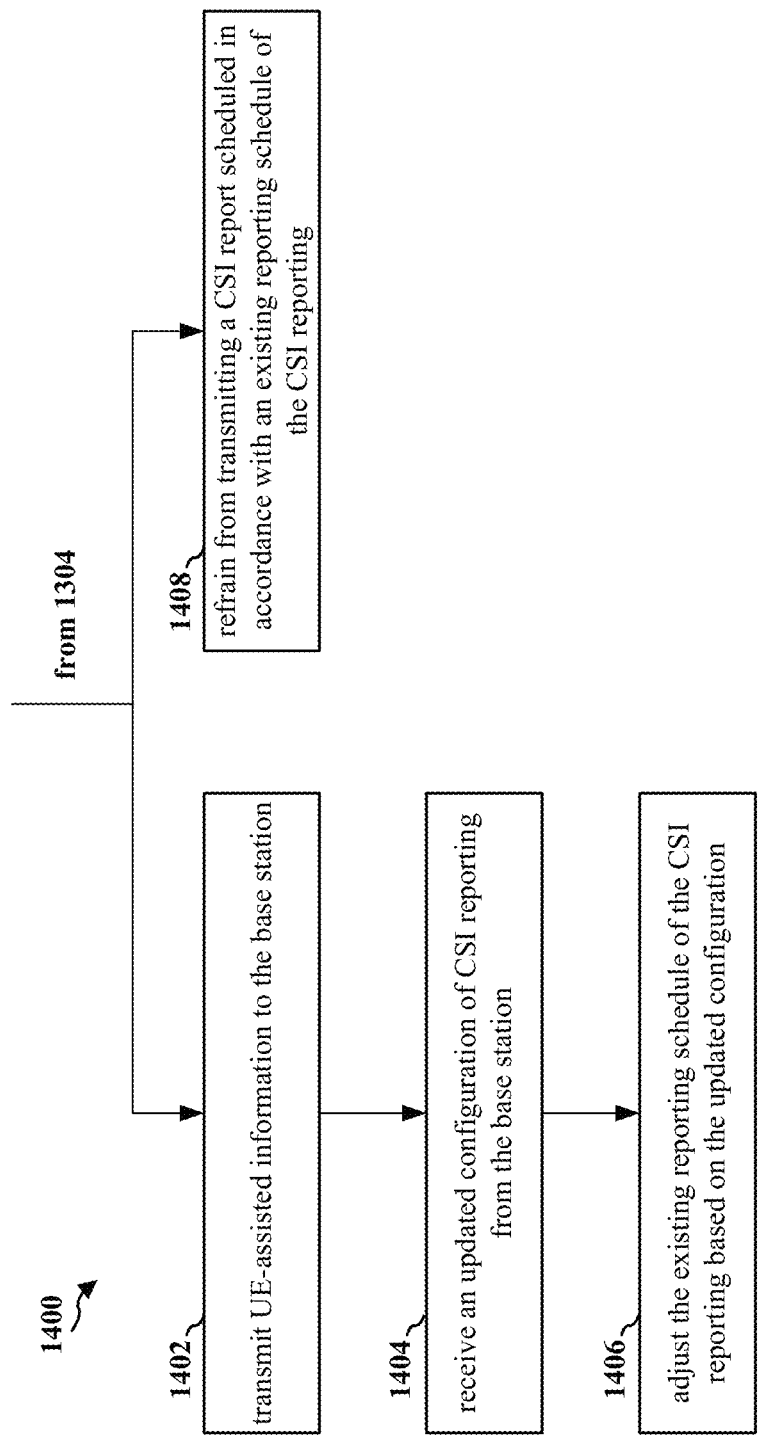
FIG. 14 is a flow chart illustrating a method (process) of power saving communications.

FIG. 14 is a flow chart 1400 illustrating a method (process) of power saving communications. The method may be performed by a UE (e.g., the UE 704, the apparatus 1502/1502'). In a first configuration, following operation 1304, at operation 1402 (e.g., as shown in FIG. 7), the UE 704 transmits UE-assisted information (e.g., the UE-assisted information 742) to the base station. In some configurations, the UE-assisted information includes the one or more parameters or an indication of an adjusted reporting schedule (e.g., the reporting schedule including the CSI reporting opportunities 765-772) of the CSI reporting. In some configurations, the indication of the adjusted reporting schedule includes a periodicity (e.g., P2) of the CSI reporting. In some configurations, the one or more parameters include a mobility parameter indicating a movement of the UE or a movement of an object adjacent to the UE. At operation 1404, the UE 704 receives an updated configuration of CSI reporting (e.g., the CSI reporting configuration 752) from the base station. At operation 1406, the UE 704 adjusts the existing reporting schedule of the CSI reporting (e.g., the reporting schedule including the CSI reporting opportunities 761-764) based on the updated configuration. In some configurations, the UE-assisted information is carried in one or more of: a Layer 1 (L1) signaling; a medium access control (MAC) control element information; and a radio resource control (RRC) message. In some configurations, the UE-assisted information is transmitted periodically or in response to the determining to adjust CSI reporting.

In a second configuration, following operation 1304, at operation 1408 (e.g., as shown in FIGS. 8-12), the UE 704 refrains from transmitting a CSI report scheduled (e.g., at the CSI reporting opportunities 963, 967-968, 970, 974, 976 and 978-979) in accordance with an existing reporting schedule of the CSI reporting.

Figure 15:
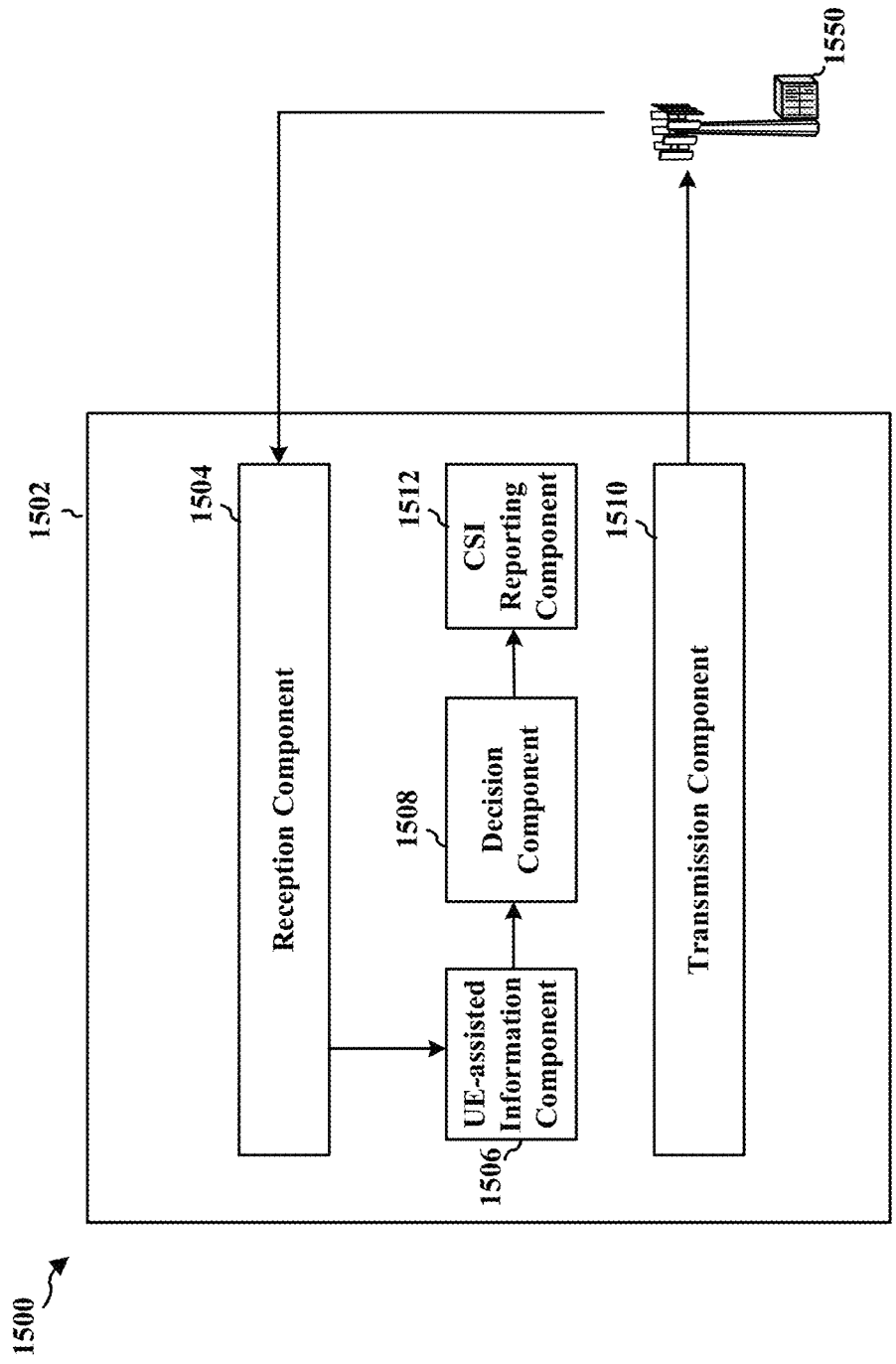
FIG. 15 is a conceptual data flow diagram illustrating the data flow between different components/means in an exemplary apparatus.

FIG. 15 is a conceptual data flow diagram 1500 illustrating the data flow between different components/means in an exemplary apparatus 1502. The apparatus 1502 may be a UE. The apparatus 1502 includes a reception component 1504, a UE-assisted information component 1506, a decision component 1508, a CSI reporting component 1512, and a transmission component 1510.

The decision component 1508 determines a first set (e.g., the CSI reporting opportunities 961, 965, 969, 973 and 977) and a second set (e.g., the CSI reporting opportunities 962-964, 966-968, 970-972, 974-976 and 978-980) of CSI reporting opportunities in according with the existing reporting schedule. The decision component 1508 determines a first value of one or more parameters indicating a reception condition of a channel from a base station (e.g., the base station 702). In some configurations, the one or more parameters includes one or more of a rank indicator (RI), a precoder matrix indicator (PMI), a channel-quality indicator (CQI), a CSI reference signal resource indicator (CRI), and a reference signal received power (RSRP). The CSI reporting component 1512 operates to determine to adjust CSI reporting based on the first value. In some configurations, the determining to adjust CSI reporting is at one of the second set of CSI reporting opportunities.

The decision component 1508 operates to determine that a difference between the first value (e.g., determined at the CSI reporting opportunity 1162) and a second value (e.g., determined at the CSI reporting opportunity 1161) of the one or more parameters determined previously is equal to or smaller than a first threshold. In some configurations, the first threshold is zero. The decision component 1508 analyzes one or more of: CQI values, RSRP values, RI values, PMI values, CRI values, and mobility parameters. The mobility parameters indicate a movement of the UE or a movement of an object adjacent to the UE. Specifically, The decision component 1508 may determine that a difference between a current CQI value (e.g., determined at the CSI reporting opportunity 1162) and a preceding CQI value (e.g., determined at the CSI reporting opportunity 1161) is equal to or smaller than a second threshold. The decision component 1508 may determine that a difference between a current RSRP value (e.g., determined at the CSI reporting opportunity 1162) and a preceding RSRP value (e.g., determined at the CSI reporting opportunity 1161) is equal to or smaller than a third threshold. The decision component 1508 may determine that a difference between a current RI value (e.g., determined at the CSI reporting opportunity 1162) and a preceding RI value (e.g., determined at the CSI reporting opportunity 1161) is equal to or smaller than a fourth threshold. The decision component 1508 may determine that a difference between a current PMI value (e.g., determined at the CSI reporting opportunity 1162) and a preceding PMI value (e.g., determined at the CSI reporting opportunity 1161) is equal to or smaller than a fifth threshold. The decision component 1508 may determine that a difference between a current CRI value (e.g., determined at the CSI reporting opportunity 1162) and a preceding CRI value (e.g., determined at the CSI reporting opportunity 1161) is equal to or smaller than a sixth threshold. The decision component

1508 may determine that a mobility parameter of the UE satisfies a first mobility condition.

As shown in FIG. 7, the UE-assisted information component 1506 transmits UE-assisted information (e.g., the UE-assisted information 742) to the base station. In some configurations, the UE-assisted information includes the one or more parameters or an indication of an adjusted reporting schedule (e.g., the reporting schedule including the CSI reporting opportunities 765-772) of the CSI reporting. In some configurations, the indication of the adjusted reporting schedule includes a periodicity (e.g., P2) of the CSI reporting. In some configurations, the one or more parameters include a mobility parameter indicating a movement of the UE or a movement of an object adjacent to the UE. The reception component 1504 receives an updated configuration of CSI reporting (e.g., the CSI reporting configuration 752) from the base station. The CSI reporting component 1512 adjusts the existing reporting schedule of the CSI reporting (e.g., the reporting schedule including the CSI reporting opportunities 761-764) based on the updated configuration. In some configurations, the UE-assisted information is carried in one or more of: a Layer 1 (L1) signaling; a medium access control (MAC) control element information; and a radio resource control (RRC) message. In some configurations, the UE-assisted information is transmitted periodically or in response to the determining to adjust CSI reporting.

Alternatively, as shown in FIGS. 8-12, the CSI reporting component 1512 refrains from transmitting a CSI report scheduled (e.g., at the CSI reporting opportunities 963, 967-968, 970, 974, 976 and 978-979) in accordance with an existing reporting schedule of the CSI reporting.

Figure 16:
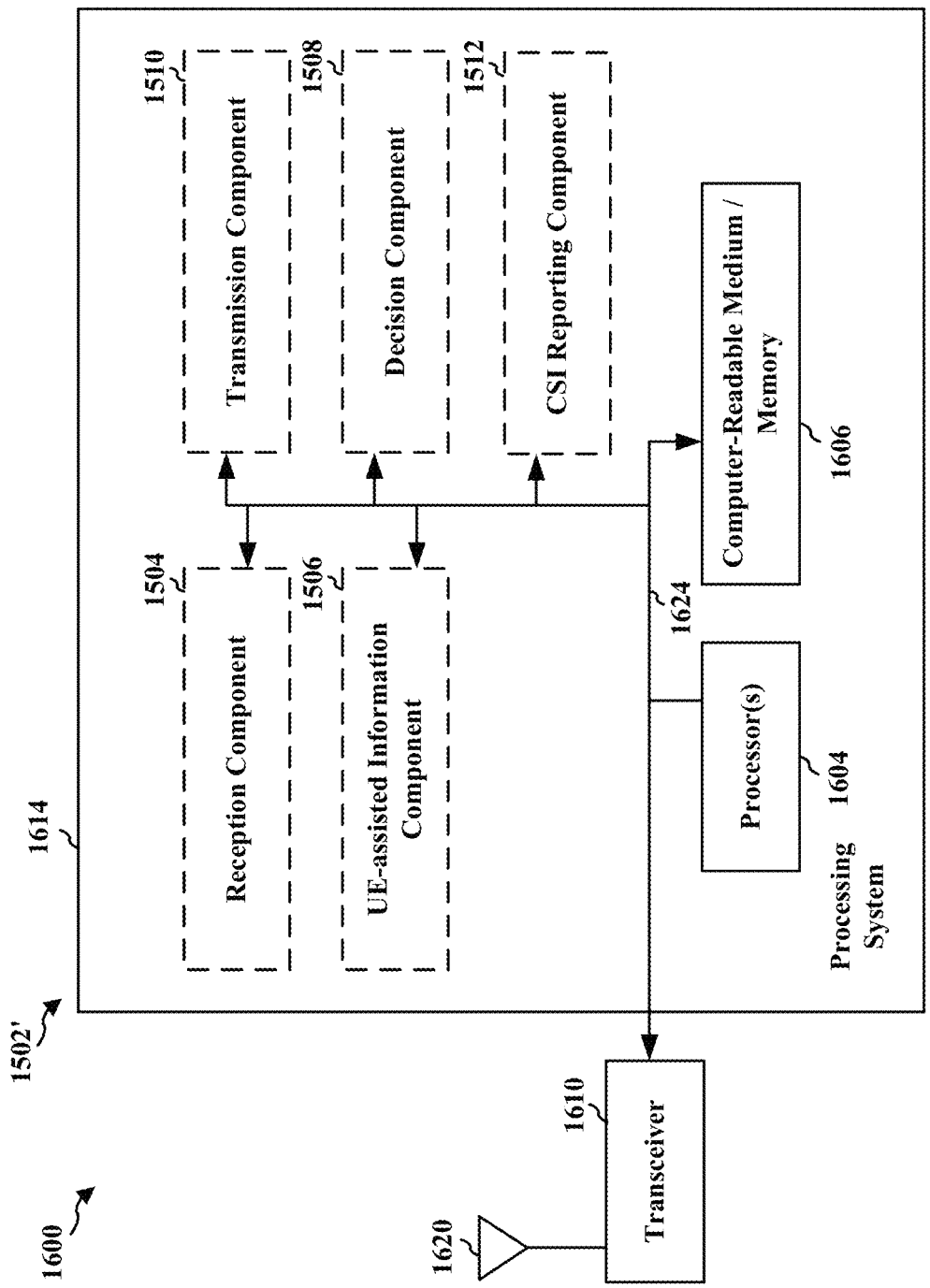
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The apparatus 1502' may be a UE. The processing system 1614 may be implemented with a bus architecture, represented generally by a bus 1624. The bus 1624 may include any number of interconnecting buses and bridges depending on the specific application of the processing system 1614 and the overall design constraints. The bus 1624 links together various circuits including one or more processors and/or hardware components, represented by one or more processors 1604, the reception component 1504, the UE-assisted information component 1506, the decision component 1508, the transmission component 1510, the CSI reporting component 1512, and a computer-readable medium/memory 1606. The bus 1624 may also link various other circuits such as timing sources, peripherals, voltage regulators, and power management circuits, etc.

The processing system 1614 may be coupled to a transceiver 1610, which may be one or more of the transceivers 254. The transceiver 1610 is coupled to one or more antennas 1620, which may be the communication antennas 252.

The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620.

The processing system 1614 includes one or more processors 1604 coupled to a computer-readable medium/memory 1606. The one or more processors 1604 are responsible for general processing, including the execution of software stored on the computer-readable medium/memory 1606. The software, when executed by the one or more processors 1604, causes the processing system 1614 to perform the various functions described supra for any particular apparatus. The computer-readable medium/memory 1606 may also be used for storing data that is manipulated by the one or more processors 1604 when executing software. The processing system 1614 further includes at least one of the reception component 1504, the UE-assisted information component 1506, the decision component 1508, the transmission component 1510, and the CSI reporting component 1512. The components may be software components running in the one or more processors 1604, resident/stored in the computer readable medium/memory 1606, one or more hardware components coupled to the one or more processors 1604, or some combination thereof. The processing system 1614 may be a component of the UE 250 and may include the memory 260 and/or at least one of the TX processor 268, the RX processor 256, and the communication processor 259.

In one configuration, the apparatus 1502/apparatus 1502' for wireless communication includes means for performing each of the operations of FIGS. 12-14. The aforementioned means may be one or more of the aforementioned components of the apparatus 1502 and/or the processing system 1614 of the apparatus 1502' configured to perform the functions recited by the aforementioned means.

As described supra, the processing system 1614 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining a first value or a variation of one or more parameters indicating a reception condition of a channel from a base station;
   determining a first set of CSI reporting opportunities and a second set of CSI reporting opportunities in according with an existing reporting schedule, wherein the UE is required to perform CSI reporting at each reporting opportunity of the first set of CSI reporting opportunities, wherein the UE is allowed to skip CSI reporting at each reporting opportunity of the second set of CSI reporting opportunities;
   determining to adjust channel state information (CSI) reporting based on the first value or the variation; and
   refraining from transmitting a CSI report scheduled to be transmitted at a reporting opportunity of the second set of CSI reporting opportunities in accordance with the existing reporting schedule of the CSI reporting.

2. The method of claim 1, wherein the CSI reporting includes reporting of at least one of a rank indicator (RI), a precoder matrix indicator (PMI), a channel-quality indicator (CQI), a CSI reference signal resource indicator (CRI), and a Layer 1 reference signal received power (RSRP).

3. The method of claim 1, wherein the one or more parameters includes one or more of a rank indicator (RI), a precoder matrix indicator (PMI), a channel-quality indicator (CQI), a CSI reference signal resource indicator (CRI), and a reference signal received power (RSRP).

4. The method of claim 1, wherein the determining to adjust CSI reporting based on the first value or the variation includes:
   determining that the variation meets a corresponding variation threshold.

5. The method of claim 4, wherein the determining that the variation meets the corresponding variation threshold includes:
   determining that a difference between the first value and a second value of the one or more parameters determined previously is equal to or smaller than the corresponding variation threshold.

6. The method of claim 5, wherein the determining that a difference between the first value and the second value of the one or more parameters determined previously is equal to or smaller than the corresponding variation threshold includes one or more of:
   determining that a difference between a current CQI value and a preceding CQI value is equal to or smaller than a CQI variation threshold;
   determining that a difference between a current RSRP value and a preceding RSRP value is equal to or smaller than an RSRP variation threshold;
   determining that a difference between a current RI value and a preceding RI value is equal to or smaller than an RI variation threshold;
   determining that a difference between a current PMI value and a preceding PMI value is equal to or smaller than a PMI variation threshold;
   determining that a difference between a current CRI value and a preceding CRI value is equal to or smaller than a CRI variation threshold; and
   determining that a mobility parameter of the UE satisfies a first mobility condition, the mobility parameter indicating a movement of the UE or a movement of an object adjacent to the UE.

7. The method of claim 5, wherein the corresponding variation threshold is zero.

8. The method of claim 1, further comprising: transmitting UE-assisted information to the base station, the UE-assisted information including the one or more parameters or an indication of an adjusted reporting schedule of the CSI reporting, wherein the indication of the adjusted reporting schedule includes a periodicity of the CSI reporting.

9. The method of claim 1, wherein the one or more parameters include a mobility parameter indicating a movement of the UE or a movement of an object adjacent to the UE.

10. The method of claim 8, wherein the UE-assisted information is transmitted to the base station, the method further comprising:
    receiving an updated configuration of CSI reporting from the base station; and
    adjusting the existing reporting schedule of the CSI reporting based on the updated configuration.

11. The method of claim 10, wherein the UE-assisted information is carried in one or more of:
    a Layer 1 (L1) signaling;
    a medium access control (MAC) control element information; and
    a radio resource control (RRC) message.

12. The method of claim 10, wherein the UE-assisted information is transmitted periodically or in response to the determining to adjust CSI reporting.

13. An apparatus for wireless communication, the apparatus being a user equipment (UE), comprising:
    a memory; and
    at least one processor coupled to the memory and configured to:
      determine a first set of CSI reporting opportunities and a second set of CSI reporting opportunities in according with an existing reporting schedule, wherein the UE is required to perform CSI reporting at each reporting opportunity of the first set of CSI reporting opportunities, wherein the UE is allowed to skip CSI reporting at each reporting opportunity of the second set of CSI reporting opportunities;
      determine to adjust channel state information (CSI) reporting based on the first value or the variation; and
      refrain from transmitting a CSI report scheduled to be transmitted at a reporting opportunity of the second set of CSI reporting opportunities in accordance with the existing reporting schedule of the CSI reporting.

14. The apparatus of claim 13, wherein the CSI reporting includes reporting of at least one of a rank indicator (RI), a precoder matrix indicator (PMI), a channel-quality indicator (CQI), a CSI reference signal resource indicator (CRI), and a Layer 1 reference signal received power (RSRP).

15. The apparatus of claim 13, wherein the one or more parameters includes one or more of a rank indicator (RI), a precoder matrix indicator (PMI), a channel-quality indicator (CQI), a CSI reference signal resource indicator (CRI), and a reference signal received power (RSRP).

16. The apparatus of claim 13, wherein to determine to adjust CSI reporting based on the first value or the variation, the at least one processor is further configured to:
   determine that the variation meets a corresponding variation threshold.

17. The apparatus of claim 16, wherein to determine that the variation meets the corresponding variation threshold, the at least one processor is further configured to:
   determine that a difference between the first value and a second value of the one or more parameters determined previously is equal to or smaller than the corresponding variation threshold.

18. The apparatus of claim 17, wherein the corresponding variation threshold is zero.

19. A non-transitory computer-readable medium storing computer executable code for wireless communication of wireless equipment, comprising code that, when executed on a processor, causes the processor to:
   determine a first set of CSI reporting opportunities and a second set of CSI reporting opportunities in according with an existing reporting schedule, wherein the UE is required to perform CSI reporting at each reporting opportunity of the first set of CSI reporting opportunities, wherein the UE is allowed to skip CSI reporting at each reporting opportunity of the second set of CSI reporting opportunities;
   determine to adjust channel state information (CSI) reporting based on the first value or the variation; and
   refrain from transmitting a CSI report scheduled to be transmitted at a reporting opportunity of the second set of CSI reporting opportunities in accordance with the existing reporting schedule of the CSI reporting.

* * * * *